United States Patent [19]

Vescio et al.

[11] Patent Number: 4,628,415
[45] Date of Patent: Dec. 9, 1986

[54] AUTOMOTIVE LAMP

[75] Inventors: Donald W. Vescio, Fulton; Harry T. Travers, Syracuse, both of N.Y.

[73] Assignee: R. E. Dietz Company, Syracuse, N.Y.

[21] Appl. No.: 817,557

[22] Filed: Jan. 10, 1986

[51] Int. Cl.⁴ .............................................. F21V 3/00
[52] U.S. Cl. ...................................... 362/61; 362/390
[58] Field of Search ................ 362/61, 309, 310, 311, 362/390, 84, 36, 226, 237, 249, 268, 307; 339/1 L, 1 R

[56] References Cited

U.S. PATENT DOCUMENTS

| | | | |
|---|---|---|---|
| 3,222,512 | 12/1965 | Dickson | 362/390 |
| 4,390,936 | 6/1983 | Slater, Jr. et al. | 362/390 |
| 4,437,145 | 3/1984 | Roller et al. | 362/390 |
| 4,499,528 | 2/1985 | Hawlitzki | 362/61 |

Primary Examiner—Raymond A. Nelli
Attorney, Agent, or Firm—Bruns and Wall

[57] ABSTRACT

A vehicular lamp suitable to be employed as a snow-plow light employs two twin-element bulb lamps of the bayonet type as combined turn signal and parking lights, and has a lampholder arranged for mounting both the lamps. The lampholder includes a conductive bulb retainer plate and a pair of conductive resilient contact strips disposed in parallel with each other and in parallel relation with and spaced from the retainer plate. A lampholder body of a non-conductive plastic material mounts the bulb retainer plate and the contact strips, with the latter enjoying at least limited flexing motion towards and away from the retainer plate. A non-conducting resilient member, which can be an elastomeric compression grommet, is seated in the lampholder body behind the contact strips at the location of the end pins of the lamp, and urges the contact strips into contact with the associated lamp end pins. The housing body of the lamp assembly has an overall axis of symmetry, and includes a provision for attaching a mounting post on either of two positions so that the same assembly could be used as either a right side or left side lamp assembly.

8 Claims, 6 Drawing Figures

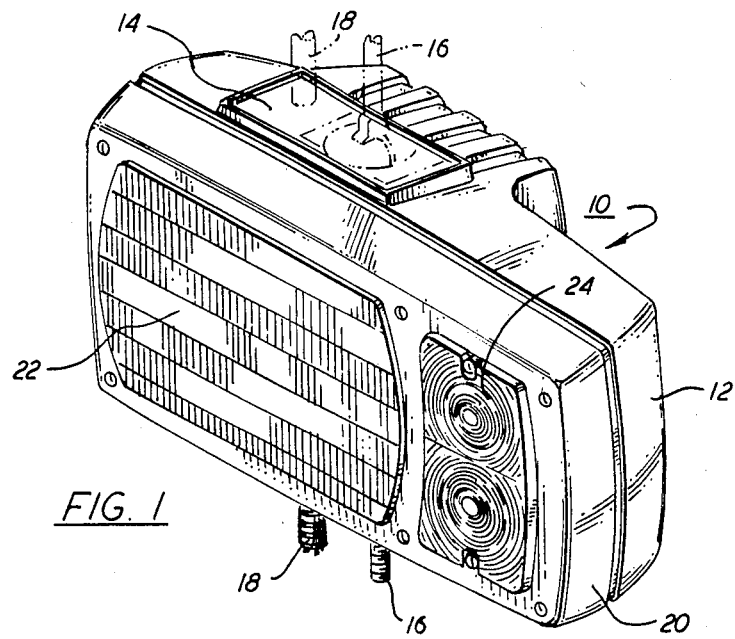
FIG. 1
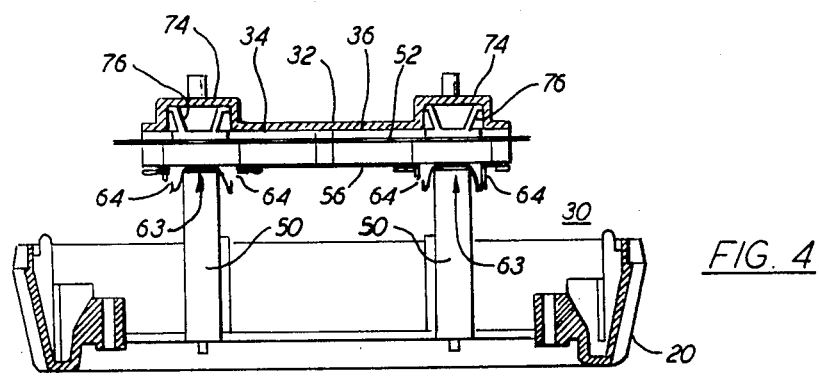
FIG. 4
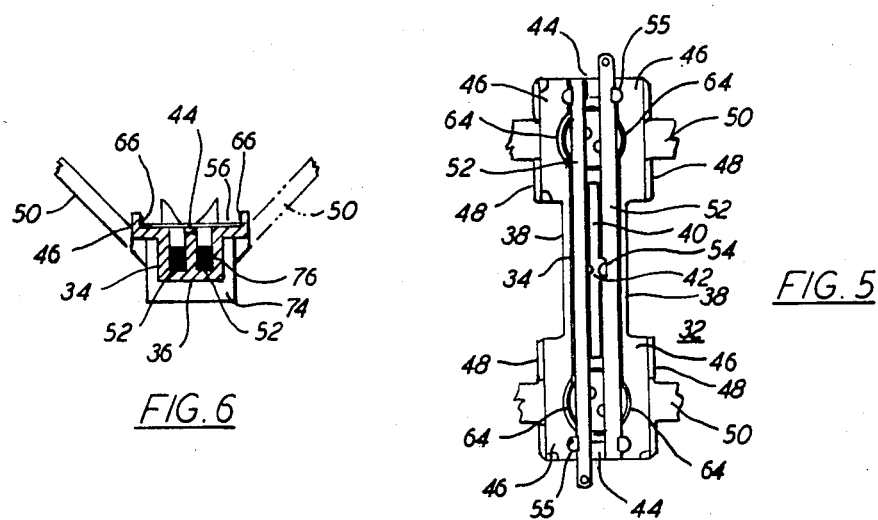
FIG. 6
FIG. 5

AUTOMOTIVE LAMP

BACKGROUND OF THE INVENTION

This invention relates to automotive type lamps, and is more particularly directed to a lamp assembly in which one or more bayonet-type twin element lamps are employed. In a favorable embodiment, a snow plow light assembly includes combined headlight, turn signal, and parking lamps.

When a snowplow blade is fitted onto a vehicle, additional headlights, turn signals, and parking lamps are provided above the plow blade because the blade will block the beam of the vehicle's original headlamps, turn signals and parking lights. A sealed beam headlight, turn signal and parking lamp are combined and housed in the same housing body, with one assembly mounted on the left or driver side of the vehicle and a similar lamp assembly mounted on the right or passenger side of the vehicle. Because of the severe vibration associated with the use of snowplows, it is required that the socket assembly for the turn signal and parking light establish reliable contact with the end pins at the base of the bulb, but be of a simple design to facilitate manufacture and bulb replacement. In order to minimize molding and tooling costs for the housing portion of the lamp assembly, it is also desired to employ the same housing for the right side vehicle light assembly and for the left side assembly.

OBJECTS AND SUMMARY OF THE INVENTION

Accordingly, it is an object of this invention to provide a lamp assembly, suitable for employment as a snowplow light or other light, having an improved socket assembly for the turn signal and parking lamp, and which avoids drawbacks of the prior art.

It is another object of this invention to provide a lamp assembly in which the housing permits the lamp assembly to be employed on either the right hand or left hand side of the vehicle.

In accordance with an aspect of this invention, a vehicular lamp assembly employs at least one twin-element bulb lamp of the bayonet type and having two lamp elements, with a cylindrical metal base, serving as a common return electrode for the elements and a pair of conductive end pins each connected to a respective one of the elements. A lamp holder disposed within a housing of the assembly has a conductive bulb retainer plate with a holder structure formed therein for holding the cylindrical base of the lamp, a pair of conductive resilient contact strips in parallel with one another and disposed in parallel relation with and spaced from the bulb retainer plate; and a lamp holder body of a nonconductive rigid material on which the bulb retainer plate and the contact strips are supported, the latter enjoying at least limited flexing motion toward and away from the retainer plate. A resilient member, which can be a synthetic-resin compression grommet, is disposed on the lamp holder body behind contact strips at the location of the end pins of the lamp, and this resilient member urges the contact strips into electrical engagement with the associated end pins of the lamp.

In the favorable embodiment in a snowplow light, the lamp holder holds two of these twin-element bulbs in alignment at one side of the housing and also holds a sealed beam lamp in a remaining portion of the housing. Here the contact strips each extend the length of the lamp holder body to contact the associated end pin of each of the lamps. In this preferred embodiment, the sealed beam headlamp and the two turn signal and parking light lamps define a horizontal axis symmetry, and the housing has a similar axis of symmetry. The housing has a pair of mounting plates disposed symmetrically on the housing on opposite sides of the symmetry axis, so that a mounting post assembly for mounting the lamp assembly onto the vehicle can be connected in either of two positions. This permits the same housing to be employed for both the right and the left side snowplow light assembly.

The foregoing and many other objects, features, and advantages of this invention will be more fully understood from the ensuing detailed description of the preferred embodiment, which should be considered in connection with the accompanying drawing.

BRIEF DESCRIPTION OF THE DRAWING

FIG. 1 is a perspective view of a snowplow lamp embodying the concepts of the present invention.

FIG. 4 is a section taken at line IV—IV of FIG. 3.

FIG. 5 is a front elevational view of a portion of the embodiment of this invention.

FIG. 6 is an end view of a portion of the embodiment of this invention.

DETAILED DESCRIPTION OF A PREFERRED EMBODIMENT

Figure 2:
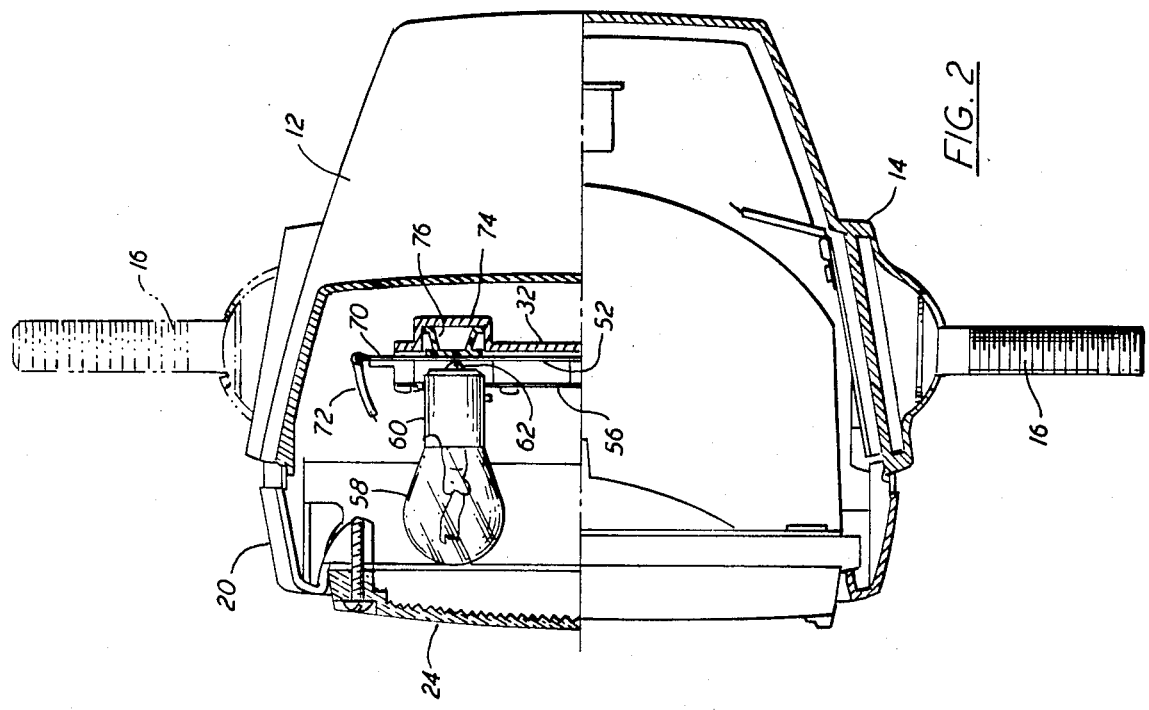
FIG. 2 is a side elevation, partially in section, of the described embodiment of this invention.
Figure 3:
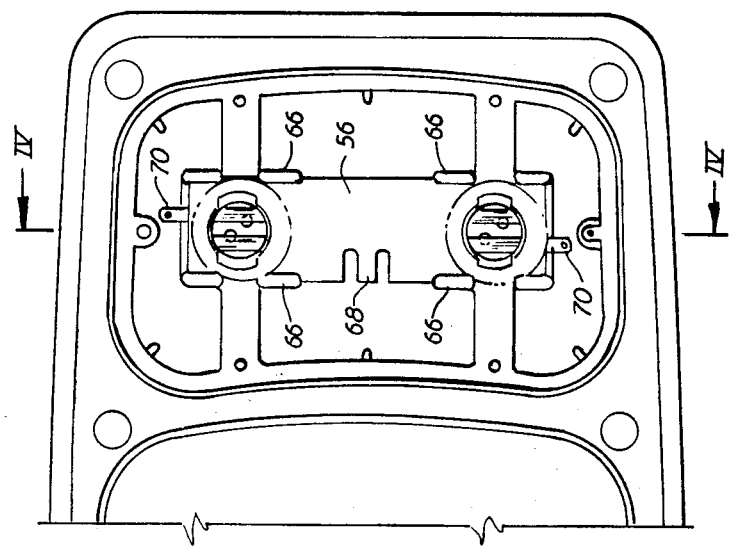
FIG. 3 is a partial front elevation of a pertinent portion of the embodiment of FIG. 1.

With reference to the drawing, and initially to FIG. 1, a lamp assembly 10 of this invention is embodied as a snowplow lamp for mounting on the left hand or driver side of a vehicle. A similar lamp assembly for mounting on the passenger or right hand side of the vehicle would be similar, but generally inverted.

The lamp assembly 10 is formed of a body or housing 12 having a mounting post plate 14 disposed at both the top and the bottom of the housing 12. A threaded mounting post assembly 16 and a lighting harness conduit 18, containing electrical leads for the lamp assembly, are connected to the lower mounting plate 14. If these elements 16 and 18 were mounted to the upper mounting plates 14, as indicated in ghost lines in FIG. 1, the assembly could be inverted and then mounted on the opposite side of the vehicle.

A front plate or lamp door 20 is screwed onto the body or housing 12 and retains sealed beam lamp 22 in a major portion of the housing 12, and also holds an amber lamp lens 24, oriented vertically and disposed to one side of the front plate 20. A pair of combined turn signals and parking light lamp are disposed behind the amber lens 24.

As shown in detail in FIGS. 2–6, a twin-bulb lamp holder assembly 30 employing the principles of this invention is unitarily formed with the front plate 20. The lamp holder assembly 30 is formed of a plastic synthetic resin body 32, generally arranged as a vertically oriented channel member 34 having a back 36 and side walls 38 defining an open front. A medial rib 40 extends between and parallel to the side walls 38 and has a laterally protruding key portion 42 formed midway along its length. A pair of end rib portions 44 are disposed at the end of the channel member 34.

The plastic body 32 also has laterally extending flanges 46 at the open front of the side walls 38, and these flanges 46 have peripheral lips 48 at their outer edges. Ribs or webs 50 integrally formed with the front plate 20 and the plastic lamp holder body 32 extend diagonally inward from the front plate 24, and suspend the lamp holder body 32 within the housing 12.

A pair of elongated contact strips 52, each of which have a cutout 54 to fit the key 42, are loosely disposed in respective channels defined by the side walls 38 and the rib 40. Here transverse protuberances 55 (FIG. 5) are formed on the side walls 38 or the rib 44 to prevent the contact strips 52 from lifting or sliding out of the channels, but permitting at least limited flexing motion in the direction towards and away from the back 36 of the plastic body 32. A metal bulb-retainer plate 56 is seated on the flanges 46 in a seat defined by the outwardly protruding peripheral lips 48, and is disposed in spaced relationship with and parallel to the contact strips 52.

A pair of twin-element bayonet-type bulb lamps 58, for example, type 1157 or the like combined parking and turn signal lamps, each have a bayonet-type cylindrical base 60 providing a current return path to ground for both of the parking light and turn signal elements within the lamps 58, and with a pair of end contact pins 62, each of which is connected to a respective one of the elements.

To accommodate the two bulb lamps 58, the bulb retaining plate 56 is formed with respective apertures 63 flanked by arcuate portions 64 of the plate 56 which retain the base 60 of the lamp 58 and also establish electrical contact with it. Retaining ears 66 are formed in the lips 48 over the retaining plate 56 by sonic welding and these ears 66 hold the plate 56 securely in place on the lamp holder body 32. A ground contact 68 is cut out at one side of the plate 56.

Electrical contacts 70 are formed at respective ends of the contact strips 52, with one such end 70 protruding from each end of the lamp holder body 32.

Leads 72 are affixed, either mechanically or soldered, to each of the electrical contacts 68, 70.

As shown in FIGS. 2, 4, and 6, a cylindrical portion 74 is formed in the back of the body 32 of the lamp holder assembly 30, at the location of each of the lamps 58. These two cylindrical portions 74, together with a space between the rib 40 and the respective end portion 44, define cylindrical receptacles for the bulb bases 60. These are generally centered on the channel members. The contact strips 52 each traverse both of the cylindrical receptacles and are so positioned to contact the respective end pins 62 of both of the bulb lamps 58 inserted into the openings 63 of the plates 56.

A pair of resilient compression grommets, here formed of an elastomeric polymer, are seated in the respective cylindrical portions 74 of the body 32 beneath the contact strips 52. These grommets 76 are compressed downward when the bulbs 58 are inserted into the opening 63 and arcuate portion 64, and thus urge the contact strips 52 against the end pins 62 to maintain the same in good electrical contact. Instead of a compression grommet, a compression spring could be employed, with a non-conductive portion affixed to it at the side contacting the contact strip 52.

In this embodiment, the metal components, including the plates 56 and the contact strips 52, are formed of an alloy of copper, such as brass, of the desired strength and resilient characteristics, and having good conductivity and resistance to corrosion. The synthetic resin plastic parts, such as the housing 12, the front plate 20, and the lampholder body 32 are formed of a convenient resin material, such as polycarbonate.

For particular applications, the lampholder 30 of this invention can be designed for a single lamp or for more than two lamps, although in the preferred embodiment, the lampholder 30 mounts a pair of lamps 58.

Still further, the principles of this invention are not limited to the embodiment as a snowplow light, as the principles of this invention could be employed in other automotive, marine, or aviation lighting systems.

While the invention has been described in detail hereinabove with reference to a preferred embodiment, it should be recognized that the invention is not limited to that embodiment, and that many modifications and variations would present themselves to those skilled in the art without departure from the scope and spirit of this invention, as defined in the appended claims.

I claim:

1. A vehicular lamp assembly comprising a housing; at least one twin-element bulb lamp of the bayonet type having two lamp elements and a cylindrical metal base serving as a common return electrode for said elements and a pair of conductive end pins each connected to a respective one of said elements; and a lampholder in which said at least one lamp is mounted within said housing, said lampholder including
 a conductive bulb retainer plate having formed therein means for holding said base and maintaining electrical contact with the same, a pair of conductive resilient contact strips parallel with one another and disposed in parallel relation with and spaced from said bulb retainer plate; a lampholder body of non-conductive rigid material and including means mounting said bulb retainer plate and mounting said contact strips for at least limited flexing motion towards and away from said retainer plate; and resilient means, mounted on said lampholder body and behind said contact strips at the location of the end pins of said lamp, for urging said contact strips into contact with the associated end pins.

2. A vehicular lamp assembly according to claim 1 wherein said lampholder body is molded of a synthetic resin and includes a channel member having a back, sidewalls, and an open front, a medial divider rib extending parallel to and midway between said sidewalls defining channels in which said contact strips are respectively disposed, and a pair of lateral flanges extending outward from said sidewalls at the open front of the channel member for supporting the bulb retainer plate.

3. A vehicular lamp assembly according to claim 2 wherein said lampholder body further includes peripheral lips extending forward from the lateral flanges and defining a recess for seating said bulb retainer plate, and means formed in said peripheral lips for holding the retainer plate seated in said recess.

4. A vehicular lampholder assembly according to claim 2 wherein said lampholder body includes lamp seat means forming a generally cylindrical recess for receiving the base of said lamp and being generally centered on said channel member with said contact strips traversing the recess formed by said lamp seat means, said lamp seat means also including means for holding said resilient means within said recess behind said contact strips.

5. A vehicular lampholder assembly according to claim 4 wherein said resilient means includes a spring member, at least a front portion thereof in contact with said contact strips being formed of an insulating material.

6. A vehicular lampholder assembly according to claim 5 wherein said spring member is an elastomeric compression grommet.

7. A vehicular lamp assembly according to claim 1 wherein said lampholder holds two of said bulb lamps in alignment at one side of said housing and further comprises a sealed beam lamp held in a remaining portion of said housing, with the holding means of said conductive retainer plate including two receptacles for respectively holding the two bulb lamps, and said contact strips each extend behind both said receptacles and contact corresponding end pins of both said bulb lamps.

8. A vehicular lamp assembly according to claim 7 wherein said housing, said sealed beam lamp and said two bulb lamps define an axis of symmetry passing through said sealed beam lamp and between said bulb lamps, said housing having a pair of mounting plates disposed symmetrically on said housing on opposite sides of said axis of symmetry; and further comprising a mounting post assembly for mounting said lamp assembly on a vehicle, said mounting post assembly including means seating on a desired one of either of said mounting plates, thereby permitting said lamp assembly to be employed as either a right-side or left-side lamp assembly.

* * * * *